United States Patent
Chen et al.

(10) Patent No.: US 11,366,541 B2
(45) Date of Patent: Jun. 21, 2022

(54) DISPLAY DEVICE AND ELECTRONIC APPARATUS

(71) Applicants: Wuhan Tianma Micro-Electronics Co., Ltd., Wuhan (CN); Wuhan Tianma Microelectronics Co., Ltd. Shanghai Branch, Shanghai (CN)

(72) Inventors: Min Chen, Shanghai (CN); Xinzhao Liu, Shanghai (CN); Qingxia Wang, Shanghai (CN)

(73) Assignees: Wuhan Tianma Micro-Electronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 17/136,032

(22) Filed: Dec. 29, 2020

(65) Prior Publication Data

US 2021/0117032 A1    Apr. 22, 2021

(30) Foreign Application Priority Data

Oct. 30, 2020   (CN) .......................... 202011189437.6

(51) Int. Cl.
*G06F 3/041*      (2006.01)
*G06F 3/044*      (2006.01)

(52) U.S. Cl.
CPC .......... *G06F 3/0412* (2013.01); *G06F 3/0445* (2019.05); *G06F 3/0446* (2019.05); *G06F 3/0448* (2019.05)

(58) Field of Classification Search
CPC ..... G06F 3/0412; G06F 3/0445; G06F 3/0446
USPC ................................................... 345/173, 174
See application file for complete search history.

(56) References Cited

U.S. PATENT DOCUMENTS

| | | | | |
|---|---|---|---|---|
| 8,647,519 B1* | 2/2014 | Lin | ....................... | G06F 3/0443 216/13 |
| 2017/0293381 A1* | 10/2017 | Lee | ....................... | G06F 3/0443 |
| 2019/0384428 A1* | 12/2019 | Ahn | ....................... | G06F 3/044 |
| 2020/0110490 A1* | 4/2020 | Zhang | ................... | G06F 3/0443 |

FOREIGN PATENT DOCUMENTS

CN      108170312 A     6/2013

* cited by examiner

*Primary Examiner* — Calvin C Ma
(74) *Attorney, Agent, or Firm* — Kilpatrick Townsend & Stockton LLP

(57) ABSTRACT

A display device and an electric apparatus are provided in the present disclosure. A touch unit of the display device includes a touch layer and an optical compensation layer arranged oppositely, the touch layer includes multiple first electrode groups and multiple second electrode groups, multiple second touch electrodes in the second electrode group are connected to each other through the optical compensation layer, and an orthographic projection of the optical compensation layer on a surface of the touch layer covers the touch layer, so that each position of the touch unit is a double-layer structure formed by the touch layer and the optical compensation layer, which avoids the problem that an electrode bridge in the display device may be visible in some cases caused by different light absorption levels in certain areas of the touch unit due to the different number of film layers.

29 Claims, 12 Drawing Sheets

DISPLAY DEVICE AND ELECTRONIC APPARATUS

CROSS REFERENCE OF RELATED APPLICATION

The present application claims priority to Chinese Patent Application No. 202011189437.6, titled "DISPLAY DEVICE AND ELECTRONIC APPARATUS", filed on Oct. 30, 2020 with the China National Intellectual Property Administration, which is incorporated herein by reference in its entirety.

FIELD

The present disclosure relates to the field of display technology, and in particular, to a display device and an electronic apparatus.

BACKGROUND

With the continuous development of display technology, the integration of a touch function in a display device has become a relatively mature technology. The touch function is realized generally based on multiple electrode groups extending horizontally and vertically, respectively. Electrical connection of an electrode group extending in a direction and insulation between two electrode groups extending in different directions are realized by an electrode bridge at a crossing position of the multiple electrode groups respectively extending horizontally and vertically.

In an actual application process, it is found that the display device with an integrated touch function may have a problem that the electrode bridge in the display device may be visible in some cases, which has a negative impact on the user experience.

SUMMARY

Embodiments of display devices and electronic apparatuses are disclosed.

In an embodiment, a display device may include a display unit and a touch unit. The touch unit may include a touch layer and an optical compensation layer arranged oppositely. The touch layer and the optical compensation layer may be insulated from each other. An orthographic projection of the optical compensation layer on a surface of the touch layer may cover the touch layer. The touch layer may include multiple first electrode groups arranged along a first direction and extending along a second direction and multiple second electrode groups arranged along the second direction and extending along the first direction. The first direction and the second direction may intersect. The multiple first electrode groups may be insulated from the multiple second electrode groups. At least one of the multiple first electrode groups may include multiple first touch electrodes connected to each other. At least one of the multiple second electrode groups may include multiple second touch electrodes connected to each other through the optical compensation layer.

In an embodiment, an electric apparatus may include the display device described above.

BRIEF DESCRIPTION OF THE DRAWINGS

Embodiments of the present disclosure are shown, hereinafter are briefly described the drawings to be applied in embodiments of the present. Apparently, the drawings in the following descriptions are only some embodiments of the present disclosure.

DETAILED DESCRIPTION OF EMBODIMENTS

Figure 1:
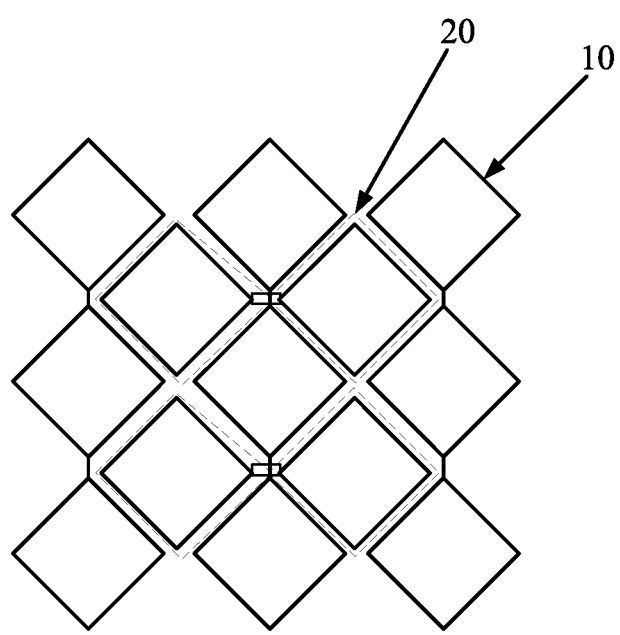
FIG. 1 is a schematic diagram of a top view structure of a touch unit according to conventional technologies.

As described in the background, referring to FIG. 1, FIG. 1 is a schematic diagram of a top view structure of a touch unit according to conventional technologies. The touch unit includes first electrode groups 10 arranged horizontally and second electrode groups 20 arranged longitudinally. The second electrode group 20 includes multiple discrete second touch electrodes, which are arranged in an area where connection positions between first touch electrodes in the first electrode group 10 overlap. In this case, electrical connection of the discrete second touch electrodes needs to be realized by bridging. The inventor found that a double-layer film structure is formed in an area where an electrode bridge is located and a single-layer film structure is formed in other areas. When the display device is displaying certain pictures, especially a full blue picture, a display picture of the display panel in the double-layer film area will be significantly different from pictures in other areas due to a large absorption rate of blue light by a preparation material of the touch electrode, which will cause the problem that the electrode bridge in the display device may be visible.

In order to solve the above problem, a display device is provided according to solutions of the present disclosure based on the principle of optical compensation. The display device is further provided with an optical compensation layer on the basis of a touch layer. An orthographic projection of the optical compensation layer on the touch layer covers the touch layer, and a group of electrode groups in the touch layer are connected through the optical compensation layer. Due to the existence of the optical compensation layer, each position in the touch unit is a double-layer film structure, which avoids the problem that the electrode bridge in the display device may be visible caused by the partial light absorption of the double-layer film being greater than that of the single-layer film. In addition, the optical compensation layer also functions to connect the touch electrodes in a certain electrode group, so that the touch layer can realize normal touch functions.

Embodiments of the present disclosure are described clearly and completely in conjunction with the drawings in embodiments of the present closure. Apparently, the described embodiments are only some rather than all of the embodiments of the present disclosure.

Figure 2:
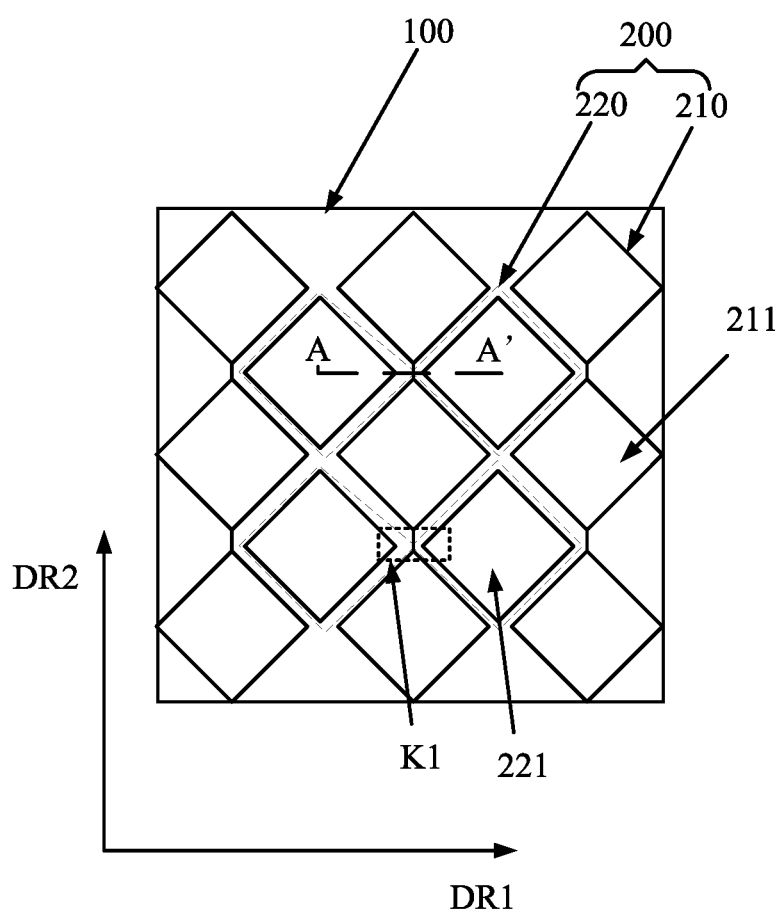
FIG. 2 is a schematic diagram of a top view structure of a display device according to an embodiment of the present disclosure.
Figure 3:
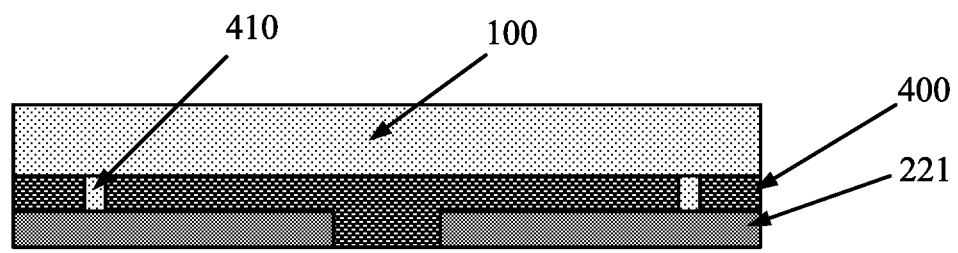
FIG. 3 is a schematic diagram of a cross-sectional structure along line AN in FIG. 2 according to an embodiment of the present disclosure.
Figure 4:
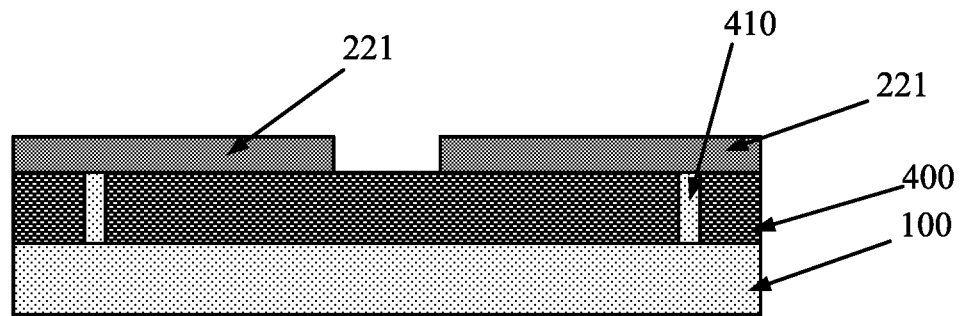
FIG. 4 is a schematic diagram of a cross-sectional structure along line AN in FIG. 2 according to another embodiment of the present disclosure.

A display deice is provided according to an embodiment of the present disclosure. As shown in FIGS. 2-4, FIG. 2 a schematic diagram of a top view structure of a display device, and FIG. 3 and FIG. 4 each is a schematic diagram of a cross-sectional structure along line AN in FIG. 2. The display device includes a display unit and a touch unit.

The touch unit includes a touch layer 200 and an optical compensation layer 100 arranged oppositely, where the touch layer 200 and the optical compensation layer 100 are insulated from each other, and an orthographic projection of the optical compensation layer 100 on a surface of the touch layer 200 covers the touch layer 200.

The touch layer 200 includes multiple first electrode groups 210 arranged along a first direction DR1 and extending along a second direction DR2 and multiple second electrode groups 220 arranged along the second direction DR2 and extending along the first direction DR1, where the first direction DR1 and the second direction DR2 intersect, and the multiple first electrode groups 210 are insulated from the multiple second electrode groups 220.

At least one of the multiple first electrode groups 210 includes multiple first touch electrodes 211 connected to each other, and at least one of the multiple second electrode groups 220 includes multiple second touch electrodes 221 connected to each other through the optical compensation layer 110.

In an embodiment, each of the multiple first electrode groups 210 may include multiple first touch electrodes 211 connected to each other, and each of the multiple second electrode groups 220 may include multiple second touch electrodes 221 connected to each other through the optical compensation layer 110.

It can be seen from FIG. 2, the first electrode group 210 in the touch layer 200 includes multiple first touch electrodes connected to each other. The second electrode group 220 includes multiple second touch electrodes connected to each other through the optical compensation layer 100. Therefore, the multiple second touch electrodes 221 in the second electrode group 220 can be used as a group of electrodes to form a mutual capacitance with the first electrode group 210 to meet the requirements of the touch function.

In FIG. 3, the touch layer 200 is arranged on a side of the optical compensation layer 100 facing the display unit. In FIG. 4, the touch layer 200 is arranged on a side of the optical compensation layer 100 facing away from the display unit. That is, a relative position relationship between the touch layer 200 and the optical compensation layer 100 is not limited in the present disclosure, as long as the touch layer 200 and the optical compensation layer 100 are arranged on one side of a light emitting direction of the display unit.

In this embodiment, the orthographic projection of the optical compensation layer 100 on the surface of the touch layer 200 covers the touch layer 200, so that each position of the touch unit is a double-layer structure form by the touch layer 200 and the optical compensation layer, which avoids the problem that the electrode bridge in the display device may be visible in some cases (especially when displaying a full blue screen) caused by different light absorption levels in certain areas of the touch unit due to the different number of film layers. In particular, in an embodiment of the present disclosure, both the touch layer 200 and the optical compensation layer 100 are indium tin oxide layers or indium zinc oxide layers. That is, the optical compensation layer 100 and the touch layer 200 are made of the same material. In this way, on the one hand, the optical compensation layer 100 can better realize the function of optical compensation, and on the other hand, it can avoid excessive contact resistance caused by the contact of dissimilar materials.

In general, referring to FIG. 3 and FIG. 4, in order to realize the insulation between the touch layer 200 and the optical compensation layer 100 (that is, the insulation between the first electrode group 210 and the optical compensation layer 100), the display device further includes an insulation layer 400 between the touch layer 200 and the optical compensation layer 100. The insulation layer 400 includes multiple first vias 410. The optical compensation layer 100 may be electrically connected to the first electrode group 210 through the first vias 410, so that adjacent first touch electrodes 211 are electrically connected to each other.

Figure 5:
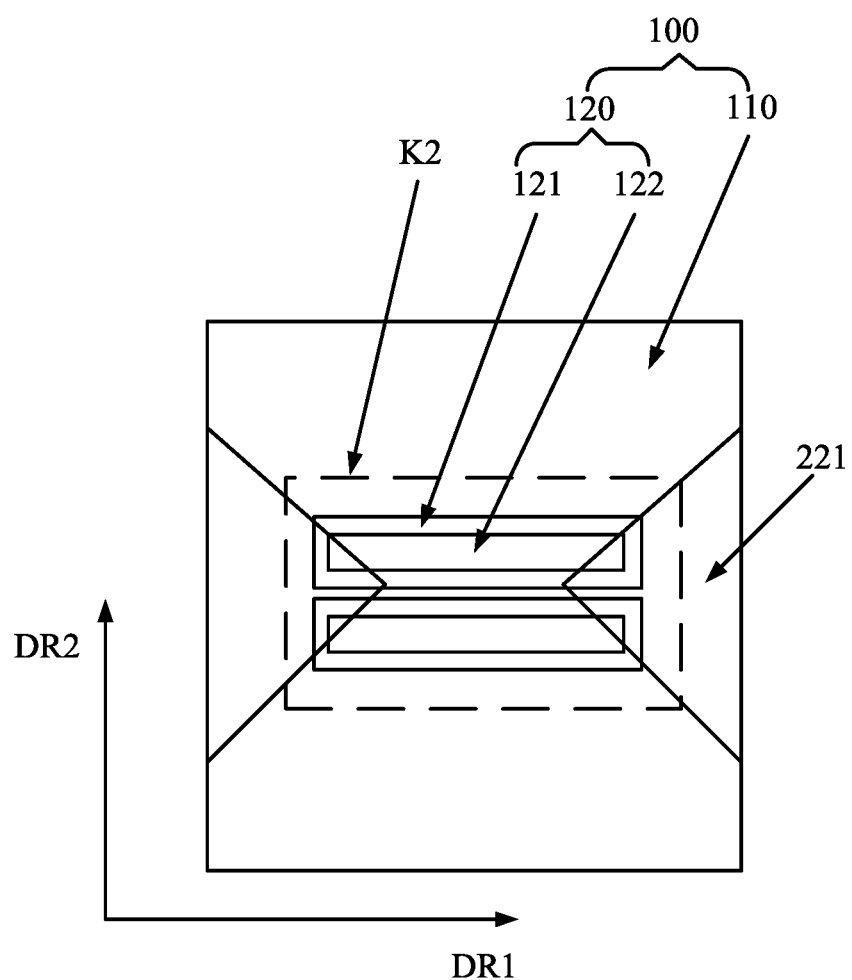
FIG. 5 is an enlarged schematic diagram of a dashed box K1 in FIG. 2 according to an embodiment of the disclosure.

In an embodiment of the present disclosure, a specific structure of the optical compensation layer 100 is provided. Referring to FIG. 5, FIG. 5 is an enlarged schematic diagram of a dashed box K1 in FIG. 2. The optical compensation layer 100 includes: an optical compensation structure 110 and a first electrode connection structure 120, where the optical compensation structure 110 is insulated from the first electrode connection structure 120.

The first electrode connection structure 120 includes at least one first connection electrode 122, and the first connection electrode 122 connects two adjacent second touch electrodes 221 through the first vias 410.

In the embodiment, the optical compensation layer 100 is divided into two parts, where the optical compensation structure 110 and the touch layer 200 corresponding to said optical compensation structure 110 form the double-layer film structure, which plays a role of optical compensation. The first electrode connection structure 120 is not only used to cooperate with the corresponding touch layer 200 for optical compensation, but also used to connect two adjacent second touch electrodes 221 to realize electrical connection of the second touch electrodes 221 in the second electrode group 220.

A forming process of the first electrode connection structure 120 and the optical compensation structure 110 may include: first, an entire conductive film layer is formed; then, the insulation between the optical compensation structure and the first electrode connection structure is realized through a photolithography process, where the photolithographic process may be a bridging forming process in conventional technologies. Therefore, there is no need to specially develop a mask for the formation of the optical compensation layer 100, which is beneficial to simplify the manufacturing process and manufacturing cost of the optical compensation layer 100.

Referring to FIG. 5, multiple first isolation structures may be generally formed in photolithography, where the first isolation structure includes a first slit 121 surrounding the first connection electrode 122. The process of separating the first connection electrode 122 from the optical compensation structure 110 by the first slit 121 is relatively mature, and the specific preparation process is relatively simple, which is beneficial to simplify the preparation process of the optical compensation layer 100. In addition, in an embodiment, a width of the first slit 121 may range from 5 μm to 10 μm. The first slit 121 within the above value range will neither cause obvious visual disturbance during the display process, nor cause obvious diffraction phenomenon to the light emitted from the display unit due to a large difference between the width of the first slit 121 and a wavelength of the light, thereby optimizing a display effect.

Figure 6:
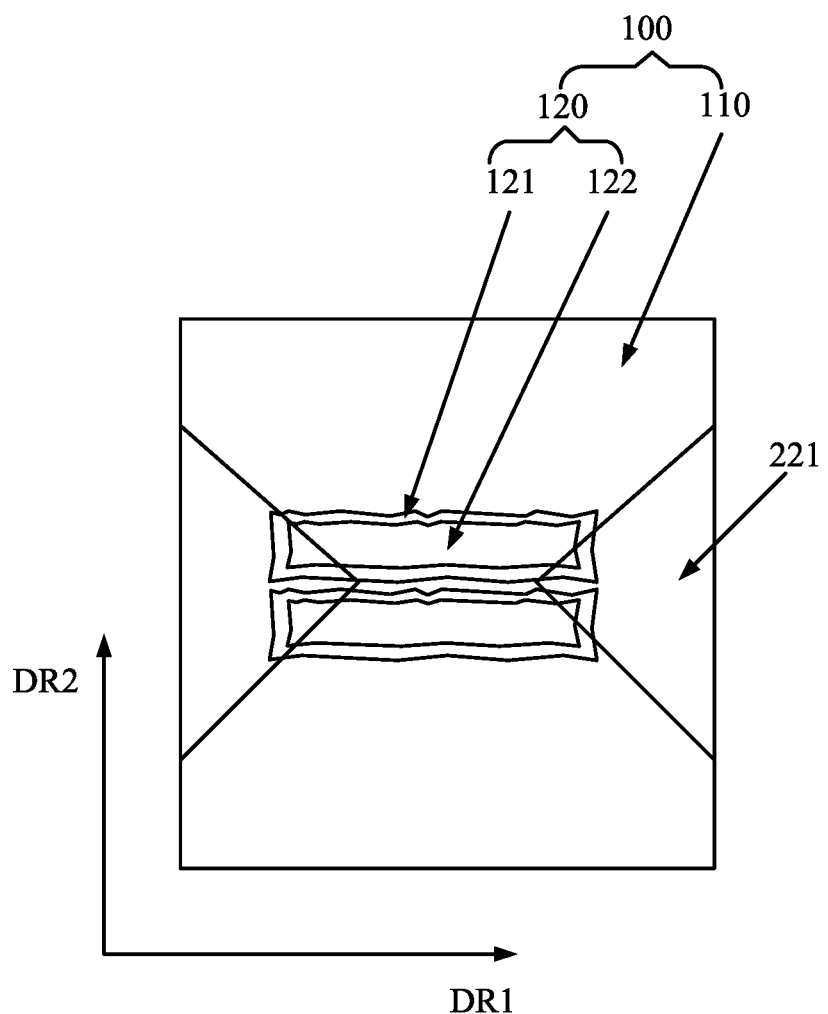
FIG. 6 is an enlarged schematic diagram of a dashed box K1 in FIG. 2 according to another embodiment of the disclosure.

In addition, referring to FIG. 6, FIG. 6 is an enlarged schematic diagram of a dashed box K1 of the optical compensation layer 100 in FIG. 2. An edge of the first slit 121 may include a curved shape, and the curved shape includes but not limited to irregular shapes such as arcs and waves. The edge of the first slit 121 includes the curved shape, which is also beneficial to avoid the diffraction of light by the first slit 121, thereby optimizing a display effect.

Figure 7:
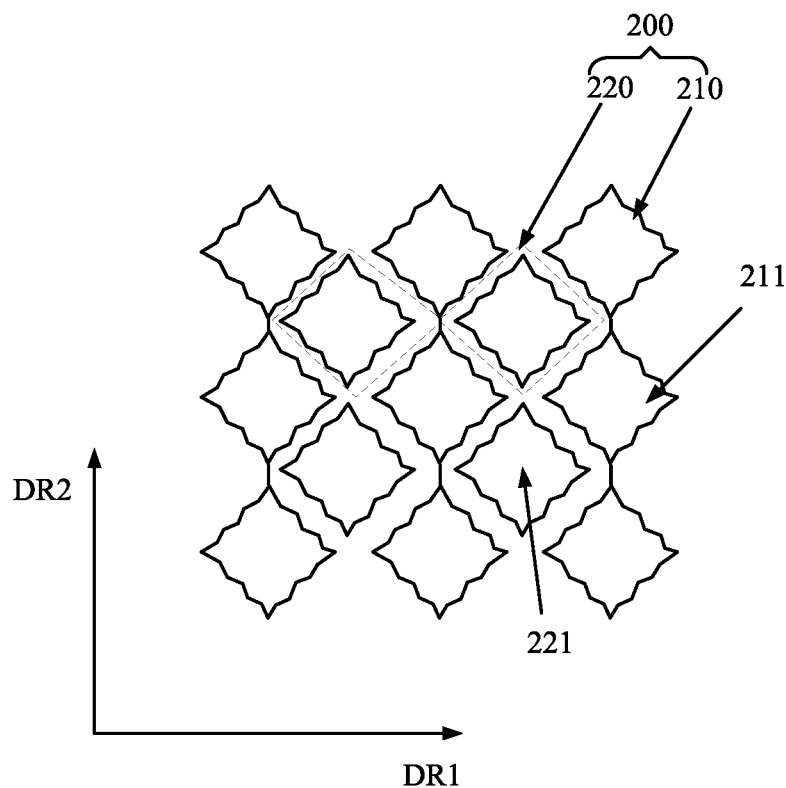
FIG. 7 is a schematic diagram of a top view structure of a touch layer according to an embodiment of the disclosure.

Similarly, in an embodiment of the present disclosure, referring to FIG. 7, FIG. 7 is a schematic diagram of a top view structure of the first touch electrode 211 and the second touch electrode 221. In the structure shown in FIG. 7, an edge of the first touch electrode 211 includes a curved shape, and an edge of the second touch electrodes 221 includes the curved shape. Similarly, edges of the first touch electrode 211 and the second touch electrode 221 includes the curved shape, which is beneficial to weaken the diffraction phenomenon generated when light passes, thereby optimizing a display effect.

Figure 8:
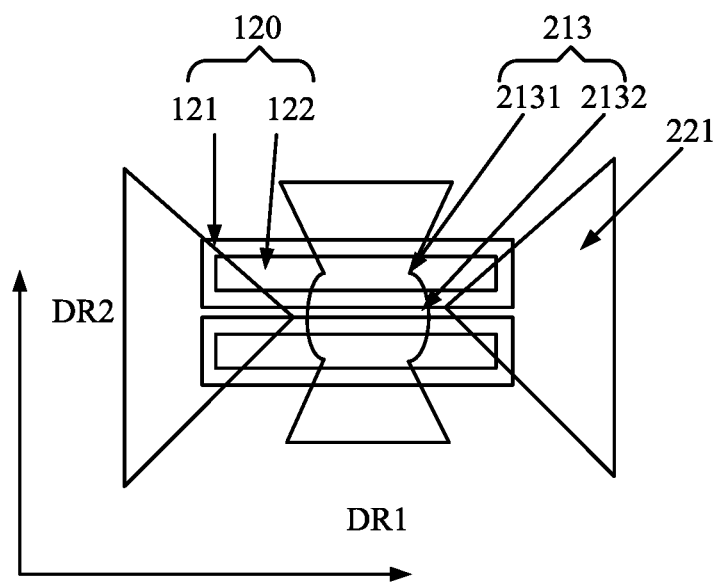
FIG. 8 is an enlarged schematic diagram of a dashed box K2 in FIG. 5 according to an embodiment of the disclosure.

On the basis of the foregoing embodiment, in another embodiment of the present disclosure, referring to FIG. 8, FIG. 8 is an enlarged schematic diagram of a dashed box K2 in FIG. 5. The first electrode connection structure 120 includes at least two first connection electrodes. The first electrode group 210 further includes a first connection portion 213, and adjacent first touch electrodes 211 are connected through the first connection portion 213. The first connection portion 213 includes a first connection area 2131 and a second connection area 2132. A length of the first connection area 2131 along the first direction DR1 is less than a length of the second connection area 2132 along the first direction DR1, and an orthographic projection of the first connection area 2131 on the touch layer overlaps an orthographic projection of the first connection electrode 122 on the touch layer.

In this embodiment, the first electrode connection structure 120 includes at least two first connection electrodes 122. A relatively large number of first connection electrodes 122 are beneficial to reduce the resistance of the first electrode connection structure 120, and avoid a sudden change in resistance between the first electrode connection structure 120 and the second touch electrode 221.

In addition, in this embodiment, the first connection portion 213 of the first electrode group 210 is made into a retracted shape as shown in FIG. 8, namely, a length of the first connection area 2131 corresponding to a position of the first connection electrode 122 is made short, which helps to reduce the length required for the first connection electrode 122 to span the first connection area 2131, thereby reducing the length of the first connection electrode 122 itself. According to the formula for calculating a resistance, in a case that the length of the first connection electrodes 122 is reduced while a cross sectional area and a conductive material are predetermined, a resistance of the first connection electrode 122 is reduced. A length of the second connection area 2132 in the first direction DR1 is relatively long, which helps to reduce the resistance of the first connection portion 213. Therefore, a sudden change in resistance between the first connection portion 213 and the first touch electrode 211 is avoided.

Figure 9:
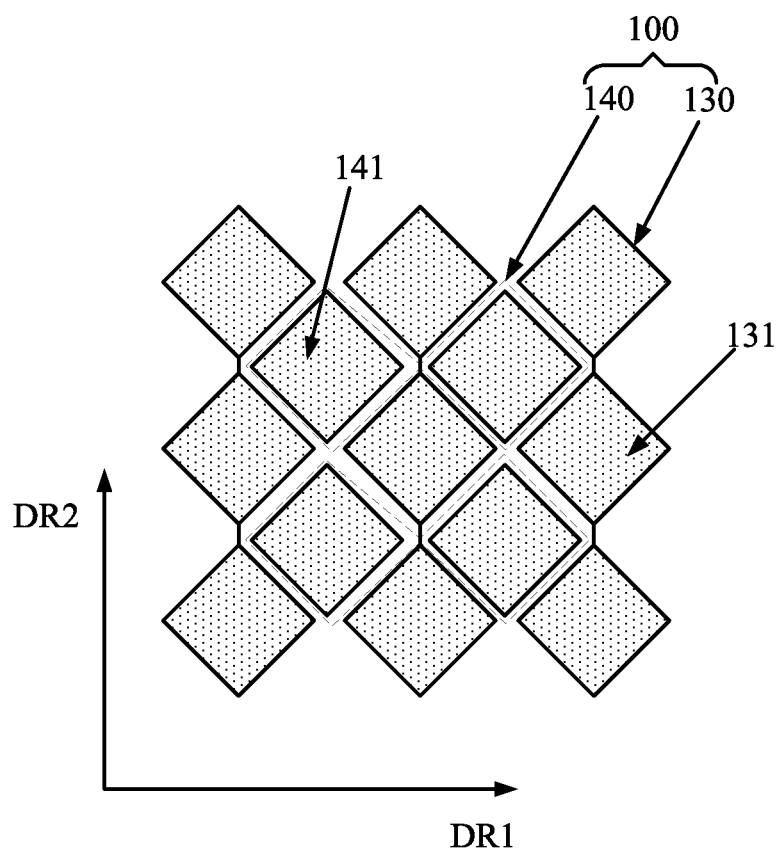
FIG. 9 is a schematic diagram of a top view structure of an optical compensation layer according to an embodiment of the disclosure.

On the basis of the foregoing embodiment, in another embodiment of the present disclosure, referring to FIG. 9, FIG. 9 is a schematic diagram of a top view structure of the optical compensation layer 100. The optical compensation layer 100 includes multiple third electrode groups 130 arranged along the first direction DR1 and extending along the second direction DR2 and multiple fourth electrode groups 140 arranged along the second direction DR2 and extending along the first direction DR1. The third electrode groups 130 are insulated from the fourth electrode groups 140. The third electrode groups 130 are connected in parallel with the first electrode groups 210, and the fourth electrode groups 140 are connected in parallel with the second electrode groups 220.

In the embodiment, the optical compensation layer 100 is divided into the third electrode groups 130 and the fourth electrode groups 140. The third electrode groups 130 are connected in parallel with the first electrode group 210 in a one-to-one correspondence. According to the parallel resistance calculation formula, when the third electrode group 130 is connected in parallel to the first electrode group 210, the resistance of the parallel electrode group can be reduced. Similarly, the fourth electrode groups 130 are connected in parallel with the second electrode groups 210 in a one-to-one correspondence, which can reduce the resistance of the parallel electrode group. That is, in this embodiment, in addition to the optical compensation function, the optical compensation layer 100 can also reduce the resistance of the first electrode group 210 and the second electrode group 220, thereby reducing the power consumption of the touch unit during operation. Therefore, the overall power consumption of the display device is reduced.

The specific parallel connection of each electrode group will be described below.

Figure 10:
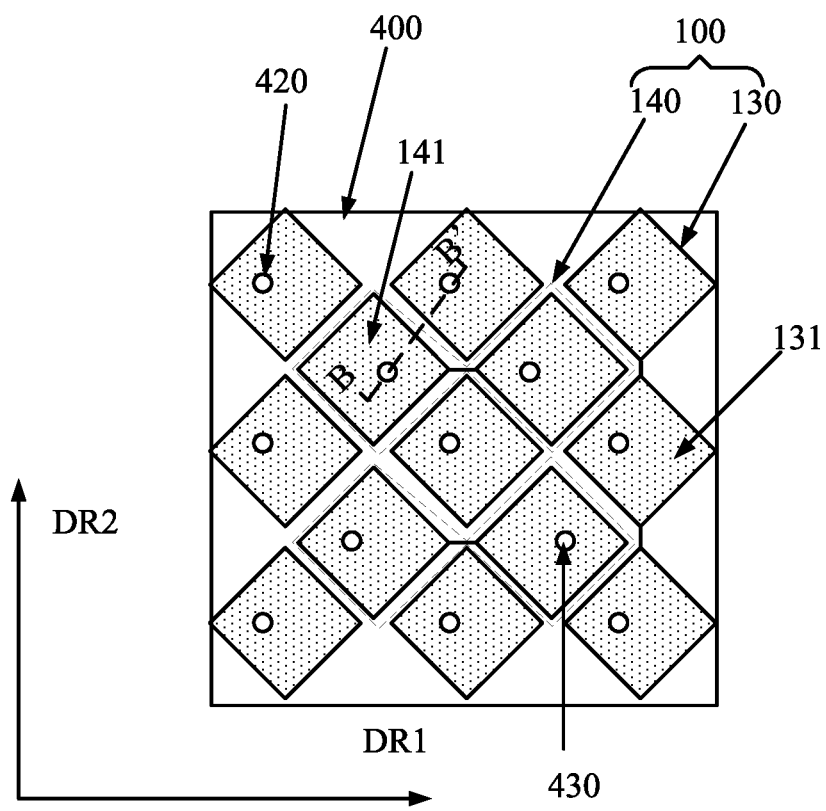
FIG. 10 a schematic diagram of a top view structure of a display device according to another embodiment of the present disclosure.
Figure 11:
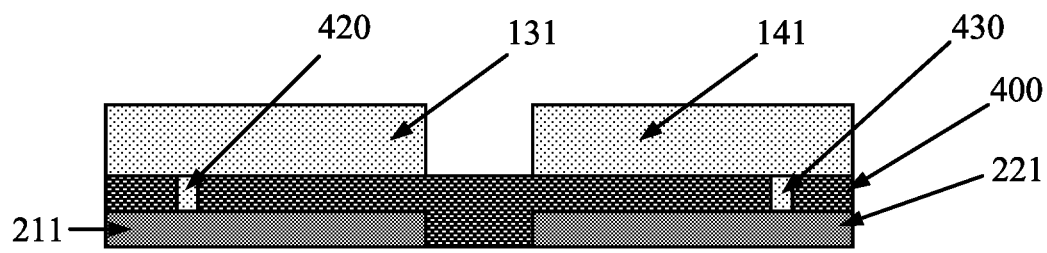
FIG. 11 is a schematic diagram of a cross-sectional structure along line BB' in FIG. 10 according to an embodiment of the present disclosure.

In an embodiment of the present disclosure, as shown in FIG. 10 and FIG. 11, FIG. 10 is a schematic diagram of a top view structure of a display device, and FIG. 11 is a schematic diagram of a cross-sectional structure along line BB' in FIG. 10. In the embodiment, the display device further incudes an insulation layer 400 arranged between the touch layer 200 and the optical compensation layer 100, and the insulation layer 400 includes multiple second vias 420 and multiple third vias 430.

The third electrode group 130 includes multiple third touch electrodes 131 and multiple second isolation structures, and the third touch electrodes 131 are electrically connected to the first electrode groups 210 through the second vias 420.

The second isolation structure includes a second slit (not shown in FIG. 10 and FIG. 11) surrounding the third touch electrode 131.

The fourth electrode group 140 includes multiple fourth touch electrodes 141 connected to each other, and the fourth touch electrodes 141 are electrically connected to the second electrode groups 220 through the third vias 430.

In the embodiment, the third electrode group 130 includes multiple third touch electrodes 131 separated from each other through the second isolation structures, and one or more second vias 420 are provided in the insulating layer 400 at a corresponding position of each third touch electrode 131. The third touch electrode 131 is electrically connected to the corresponding first touch electrode 211 through the second vias 420 to realize the parallel connection of the third electrode group 130 and the first electrode group 210. Since the multiple first touch electrodes 211 in the first electrode group 210 are connected to each other, and the third touch electrodes 131 in the third electrode group 130 are connected to the first touch electrodes 211, there is no need to bridge the third touch electrodes 131 to each other.

Similarly, the fourth touch electrodes 141 in the fourth electrode group 140 are connected to each, and one or more third vias 430 are provided in the insulating layer 400 at a corresponding position of each fourth touch electrode 141. The fourth touch electrode 141 is electrically connected to the corresponding second touch electrode 221 through the third vias 430 to realize the parallel connection of the fourth electrode group 140 and the second electrode group 220. Since the multiple fourth touch electrodes 141 in the fourth electrode group 140 are connected to each other, and the fourth touch electrodes 114 in the fourth electrode group 140 are connected in parallel to the second touch electrodes 221, there is no need to bridge the second touch electrodes 21 to each other.

Figure 12:
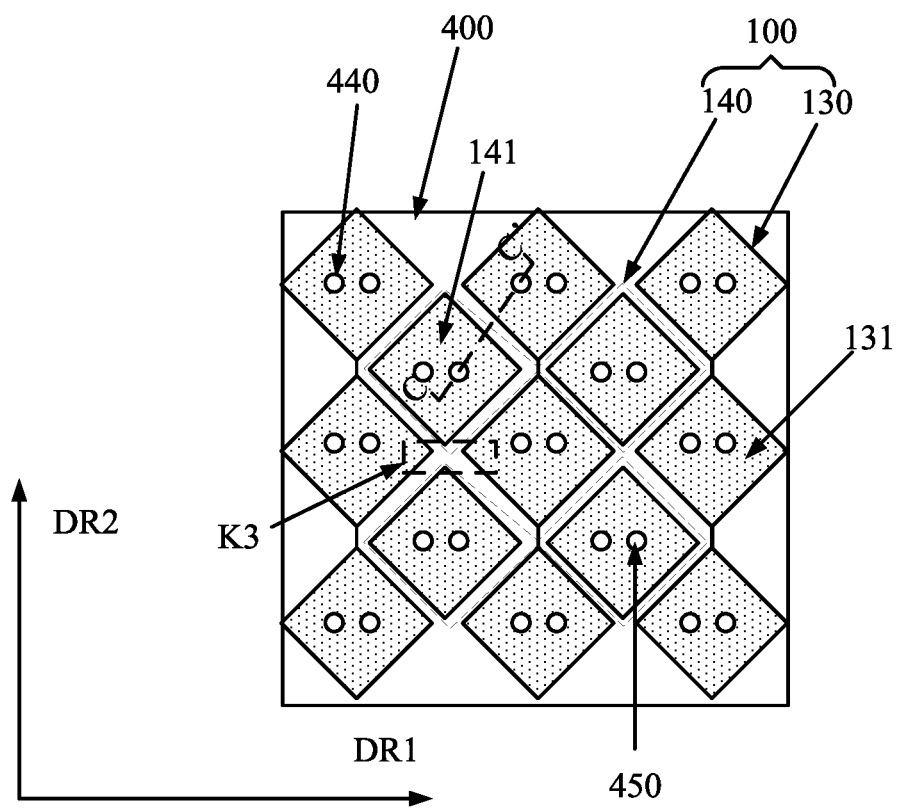
FIG. 12 is a schematic diagram of a top view structure of a display device according to another embodiment of the present disclosure.
Figure 13:
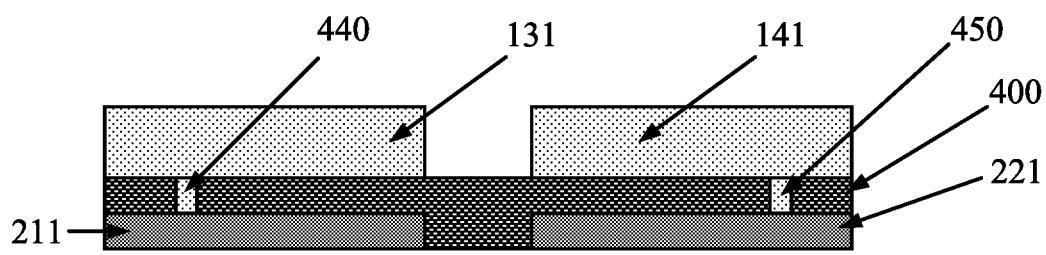
FIG. 13 is a schematic diagram of a cross-sectional structure along line CC' in FIG. 12 according to an embodiment of the present disclosure.

In another embodiment of the present disclosure, as shown in FIG. 12 and FIG. 13, FIG. 12 is a schematic diagram of a top view structure of a display device, and FIG. 13 is a schematic diagram of a cross-sectional structure along line CC' in FIG. 12. In the embodiment, the display device further incudes an insulation layer 400 arranged between the touch layer 200 and the optical compensation layer 100, and the insulation layer 400 includes multiple fourth vias 420 and multiple fifth vias 430.

The third electrode group 130 includes multiple third touch electrodes 131 connected to each other, and the third touch electrodes 131 are electrically connected to the first electrode groups 210 through the fourth vias 440.

The fourth electrode group 140 includes multiple fourth touch electrodes 141, multiple third isolation structures, and multiple second electrode connection structures. The fourth touch electrodes 141 are connected to the second electrode groups 220 through the fifth vias 450. The third isolation structure includes a third slit (not shown in FIG. 12 and FIG. 13) surrounding the fourth touch electrode 141.

The second electrode connection structure includes a second connection electrode, and the second connection electrode is used to connect adjacent fourth touch electrodes 141.

In the embodiment, the third electrode group 130 of the optical compensation layer 100 includes multiple third touch electrodes 131 connected to each other, and one or more fourth vias 440 are provided in the insulating layer 400 at a corresponding position of each third touch electrode 131. The third touch electrode 131 is electrically connected to the first touch electrode 211 corresponding to said third touch electrode 131 through the fourth vias 440 to realize the connection of the third electrode group 130 and the first electrode group 210.

Similarly, the fourth electrode group 140 of the optical compensation layer 100 includes multiple fourth touch electrodes 141 separated by multiple third isolation structures, and one or more fifth vias 450 are provided in the insulating layer 400 at a corresponding position of each fourth touch electrode 141. The fourth touch electrode 141 is electrically connected to the second touch electrode 211 corresponding to said fourth touch electrode 141 through the fifth vias 450. Since the fourth touch electrodes 141 are separated from each other, and the second touch electrodes 221 are also separated from each other, the second electrode connection structure 150 is further required to connect adjacent fourth touch electrodes 141 to realize the electrical connection between the fourth touch electrodes 141 and the electrical connection between the second touch electrodes 221.

Figure 14:
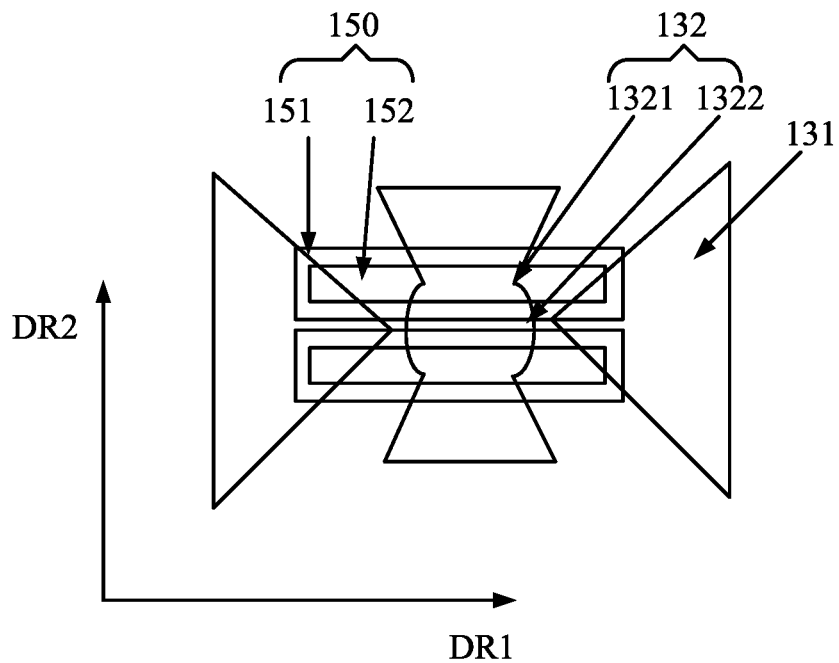
FIG. 14 is an enlarged schematic diagram of a dashed box K3 in FIG. 12 according to an embodiment of the disclosure.

Referring to FIG. 14, FIG. 14 is an enlarged schematic diagram of a dashed box K3 in FIG. 12, and the second electrode connection structure 150 includes at least two second connection electrodes 152.

In the embodiment, the third electrode group 130 further includes a second connection portion 132, and adjacent third touch electrodes 131 are connected through the second connection portion 132. The third connection portion 132 includes a third connection area 1321 and a fourth connection area 1322. A length of the third connection area 1321 along the first direction DR1 is less than a length of the fourth connection area 1322 along the first direction DR1, and an orthographic projection of the third connection area 1321 on the touch layer overlaps an orthographic projection of the second connection electrode 152 on the touch layer.

In this embodiment, the second electrode connection structure 150 includes at least two second connection electrodes 152. A relatively large number of first connection electrodes 152 are beneficial to reduce the resistance of the second electrode connection structure 150, and avoid a sudden change in resistance between the second electrode connection structure 150 and the second touch electrode 221.

In addition, in this embodiment, the second connection portion 132 of the third electrode group 130 is made into a retracted shape as shown in FIG. 14, namely, a length of the third connection area 1321 corresponding to a position of the second connection electrode 152 is made short, which helps to reduce the length required for the second connection electrode 152 to span the third connection area 1321, thereby reducing the length of the second connection electrode 152 itself. According to the formula for calculating a resistance, in a case that the length of the second connection electrodes 152 is reduced while a cross sectional area and a conductive material are predetermined, a resistance of the second connection electrode 152 is reduced. A length of the fourth connection area 1322 in the first direction DR1 is relatively long, which helps to reduce the resistance of the second connection portion 132. Therefore, a sudden change in resistance between the second connection portion 132 and the third touch electrode 131 is avoided.

Similar to the first touch electrode 211 and the second touch electrode 221, in an embodiment of the present disclosure, an edge of the third touch electrode 131 includes a curved shape, and an edge of the fourth touch electrodes 141 includes the curved shape. Edges of the third touch electrode 131 and the fourth touch electrode 141 includes the curved shape, which is beneficial to weaken the diffraction phenomenon generated when light passes, thereby optimizing a display effect.

Similarly, FIG. 14 also shows a fourth slit 151 surrounding the second connection electrode 152. For the width and formation process of the fourth slit 151, one may refer to the first slit in the description, which is not repeated herein.

Figure 15:
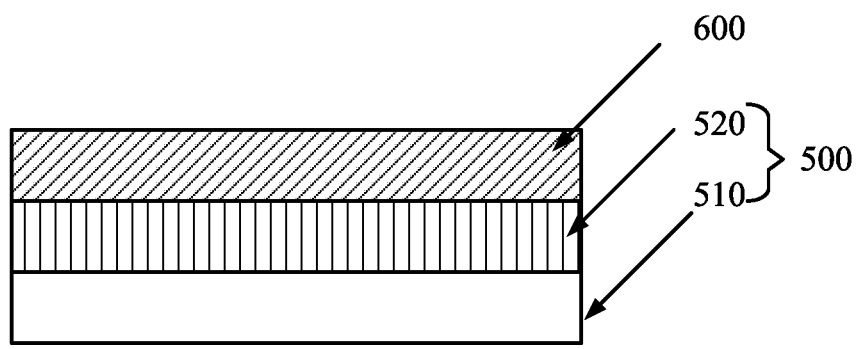
FIG. 15 is a schematic cross-sectional structure diagram of a display device according to an embodiment of the disclosure.
Figure 16:
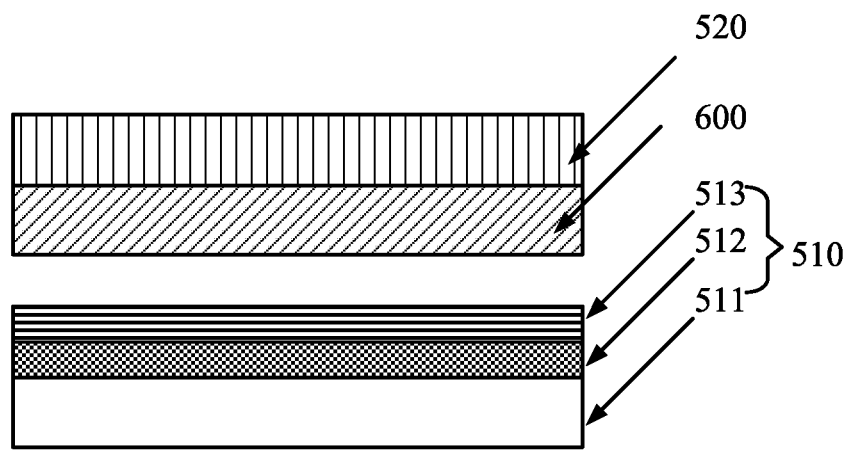
FIG. 16 is a schematic cross-sectional structure diagram of a display device according to another embodiment of the disclosure.
Figure 17:
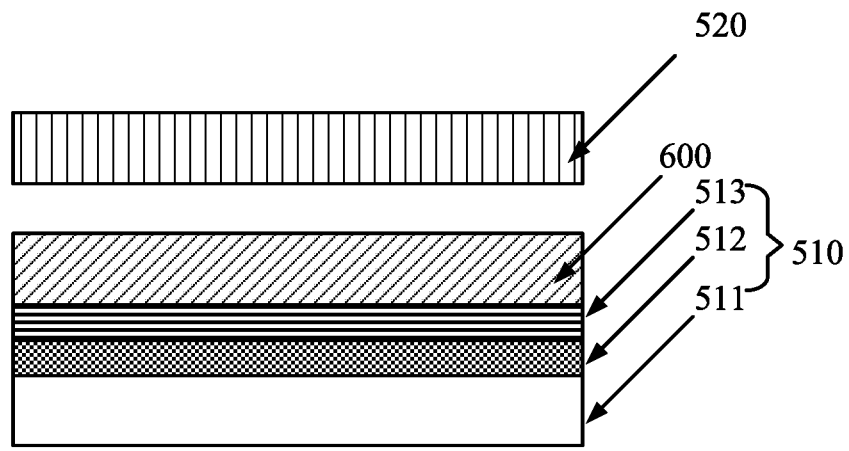
FIG. 17 is a schematic cross-sectional structure diagram of a display device according to another embodiment of the disclosure.

On the basis of the foregoing embodiment, in another embodiment of the present disclosure, referring to FIGS. 15-17. FIGS. 15-17 are schematic cross-sectional structure diagrams of a display device. In FIG. 15, a display unit 500 includes an array substrate 510 and a counter substrate 520 arranged oppositely, and a touch unit 600 is arranged on a side of the counter substrate 520 facing away from the array substrate 510. That is, in FIG. 15, the touch unit 600 is an on-cell touch unit 600, manufacturing process of which is relatively simple.

In FIG. 16 and FIG. 17, a display unit 500 includes an array substrate 510 and a counter substrate 520 arranged oppositely, the array substrate 510 includes a substrate 511, a pixel circuit layer 512 and a light emitting unit layer 513, and the pixel circuit layer 512 and the light emitting unit layer 513 are arranged on a surface of the substrate sequentially. A touch unit 600 is arranged on a side of the counter substrate 520 facing the array substrate 510, or the touch unit 600 is arranged on a side of the light emitting unit layer 513 facing away from the pixel circuit layer 512.

That is, in FIG. 16 and FIG. 17, the touch unit 600 is implemented in an in-cell manner, which is beneficial to reduce the overall thickness of the display device. In one embodiment, in FIG. 16, the touch unit 600 is arranged on the side of the counter substrate 520 facing the array substrate 510, namely, the touch unit 600 is integrated on the counter substrate 520. As shown in FIG. 17, the touch unit 600 is arranged on the side of the light-emitting unit layer 513 facing away from the pixel circuit layer 512, namely, the touch unit 600 is integrated on the array substrate 510.

Figure 18:
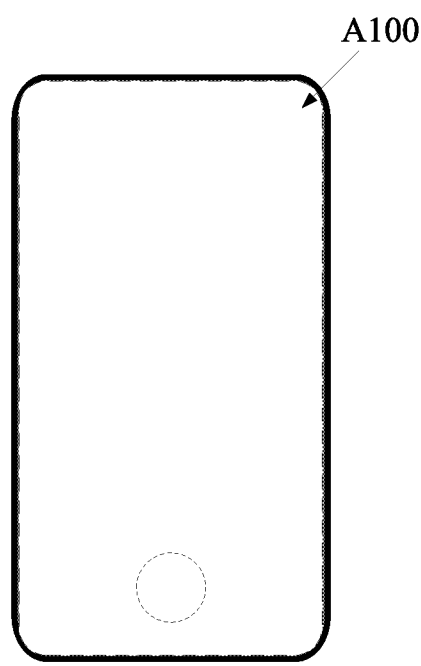
FIG. 18 is a schematic diagram of an appearance of an electric apparatus according to an embodiment of the present disclosure.

Accordingly, an electric apparatus is further provided according to an embodiment of the present disclosure. As shown in FIG. 18, FIG. 18 is a schematic structural diagram of an electric apparatus A100. The electric apparatus A100 includes the display device according to any one of the above embodiments.

In view of the above, a display device and an electric apparatus are provided according to the embodiments of the present disclosure. A touch unit of the display device includes a touch layer and an optical compensation layer arranged oppositely, the touch layer includes multiple first electrode groups and multiple second electrode groups, multiple second touch electrodes in the second electrode group are connected to each other through the optical compensation layer, and an orthographic projection of the optical compensation layer on a surface of the touch layer covers the touch layer, so that each position of the touch unit is a double-layer structure formed by the touch layer and the optical compensation layer, which avoids the problem that an electrode bridge in the display device may be visible in some cases caused by different light absorption levels in certain areas of the touch unit due to the different number of film layers.

Features in the embodiments of the present specification may be substituted for or combined with each other. Each of the embodiments emphasizes the differences from others, and the same or similar parts between the various embodiments can be referred to each other.

What is claimed is:

1. A display device, comprising:
a display unit and a touch unit, wherein
the touch unit comprises a touch layer and an optical compensation layer arranged oppositely, wherein the touch layer and the optical compensation layer are insulated from each other, and an orthographic projection of the optical compensation layer on a surface of the touch layer covers the touch layer;
the touch layer comprises a plurality of first electrode groups arranged along a first direction and extending along a second direction and a plurality of second electrode groups arranged along the second direction and extending along the first direction, wherein the first direction and the second direction intersect, and the plurality of first electrode groups are insulated from the plurality of second electrode groups; and
at least one of the plurality of first electrode groups comprises a plurality of first touch electrodes connected to each other, and at least one of the plurality of second electrode groups comprises a plurality of second touch electrodes electrically connected to each other through the optical compensation layer.

2. The display device according to claim 1, further comprising an insulation layer arranged between the touch layer and the optical compensation layer, wherein
the insulation layer comprises a plurality of first vias;
the optical compensation layer comprises an optical compensation structure and a first electrode connection structure, wherein the optical compensation structure and the first electrode connection are insulated from each other; and
the first electrode connection structure comprises at least one first connection electrode, wherein the first connection electrode is connected to two adjacent second touch electrodes through the plurality of first vias.

3. The display device according to claim 2, wherein
the first electrode connection structure comprises at least two first connection electrodes; and
at least one of the plurality of first electrode groups further comprises a first connection portion, and adjacent first touch electrodes of the plurality of first touch electrodes are connected through the first connection portion, wherein the first connection portion comprise a first connection area and a second connection area, a length of the first connection area along the first direction is less than a length of the second connection area along the first direction, and an orthographic projection of the first connection area on the touch layer overlaps an orthographic projection of one first connection electrode on the touch layer.

4. The display device according to claim 2, wherein the optical compensation layer further comprises a plurality of first isolation structures, and at least one of the plurality of first isolation structures comprises a first slit surrounding the first connection electrode.

5. The display device according to claim 4, wherein a width of the first slit ranges from 5 μm to 10 μm.

6. The display device according to claim 4, wherein an edge of the first slit comprises a curved shape.

7. The display device according to claim 1, wherein an edge of at least one of the plurality of first touch electrodes comprises a curved shape, and an edge of at least one of the plurality of the second touch electrodes comprises the curved shape.

8. The display device according to claim 1, wherein the optical compensation layer comprises a plurality of third electrode groups arranged along the first direction and extending along the second direction and a plurality of fourth electrode groups arranged along the second direction and extending along the first direction, wherein
the plurality of third electrode groups are insulated from the plurality of fourth electrode groups;
the plurality of third electrode groups are connected in parallel with the plurality of first electrode groups; and
the plurality of fourth electrode groups are connected in parallel with the plurality of second electrode groups.

9. The display device according to claim 8, further comprising an insulation layer arranged between the touch layer and the optical compensation layer, wherein
the insulation layer comprises a plurality of second vias and a plurality of third vias;
at least one of the plurality of third electrode groups comprises a plurality of third touch electrodes and a plurality of second isolation structures, the plurality of third touch electrodes are electrically connected to the plurality of first electrode groups through the plurality of the second vias, and at least one of the plurality of second isolation structures comprises a second slit surrounding a third touch electrode; and
at least one of the plurality of fourth electrode groups comprises a plurality of fourth touch electrodes connected to each other, and the plurality of fourth touch electrodes are electrically connected to the plurality of second electrode groups through the plurality of third vias.

10. The display device according to claim 9, wherein an edge of at least one of the plurality of third touch electrodes comprises a curved shape, and an edge of at least one of the plurality of fourth touch electrodes comprises the curved shape.

11. The display device according to claim 8, further comprising an insulation layer arranged between the touch layer and the optical compensation layer, wherein
the insulation layer comprises a plurality of fourth vias and a plurality of fifth vias;
at least one of the plurality of third electrode groups comprises a plurality of third touch electrodes connected to each other, and the plurality of third touch electrodes are electrically connected to the plurality of first electrode groups through the plurality of fourth vias; and
at least one of the plurality of fourth electrode groups comprises a plurality of fourth touch electrodes, a plurality of third isolation structures and a plurality of second electrode connection structures, and a plurality of fourth touch groups are electrically connected to the plurality of second electrode groups through the plurality of fourth vias, wherein at least one of the plurality of third isolation structures comprises a third slit surrounding a fourth touch electrode, and at least one of the plurality of second electrode connection structures comprises a second connection electrode used to connect adjacent fourth touch electrodes of the plurality of fourth touch electrodes.

12. The display device according to claim 11, wherein at least one of the plurality of second electrode connection structures comprises at least two second connection electrodes; and
at least one of the plurality of third electrode groups further comprises a second connection portion, and adjacent third touch electrodes of the plurality of third touch electrodes are connected to each other through the second connection portion, wherein the second connection portion comprises a third connection area and a fourth connection area, a length of the third connection area along the first direction is less than a length of the fourth connection area along the first direction, and an orthographic projection of the third connection area on the touch layer overlaps an orthographic projection of the second connection electrode on the touch layer.

13. The display device according to claim 12 wherein an edge of at least one of the plurality of third touch electrodes comprises a curved shape, and an edge of at least one of the plurality of fourth touch electrodes comprises the curved shape.

14. The display device according to claim 11 wherein an edge of at least one of the plurality of third touch electrodes comprises a curved shape, and an edge of at least one of the plurality of fourth touch electrodes comprises the curved shape.

15. The display device according to claim 1, wherein both the touch layer and the optical compensation layer are indium tin oxide layers or indium zinc oxide layers.

16. The display device according to claim 1, wherein the display unit comprises an array substrate and a counter substrate arranged oppositely, and the touch unit is arranged on a side of the counter substrate facing away from the array substrate.

17. The display device according to claim 1, wherein the display unit comprises an array substrate and a counter substrate arranged oppositely, the array substrate comprises a substrate, a pixel circuit layer and a light emitting unit layer, and the pixel circuit layer and the light emitting unit layer are arranged on a surface of the substrate sequentially, wherein
the touch unit is arranged on a side of the counter substrate facing the array substrate;
or
the touch unit is arranged on a side of the light emitting unit layer facing away from the pixel circuit layer.

18. An electric apparatus, comprising:
a display device, wherein the display device comprises a display unit and a touch unit, wherein
the touch unit comprises a touch layer and an optical compensation layer arranged oppositely, wherein the touch layer and the optical compensation layer are insulated from each other, and an orthographic projection of the optical compensation layer on a surface of the touch layer covers the touch layer;
the touch layer comprises a plurality of first electrode groups arranged along a first direction and extending along a second direction and a plurality of second electrode groups arranged along the second direction and extending along the first direction, wherein the first direction and the second direction intersect, and the plurality of first electrode groups are insulated from the plurality of second electrode groups; and
at least one of the plurality of first electrode groups comprises a plurality of first touch electrodes connected to each other, and at least one of the plurality of second electrode groups comprises a plurality of second touch electrodes electrically connected to each other through the optical compensation layer.

19. A display device, comprising:
a display unit and a touch unit, wherein
the touch unit comprises a touch layer and an optical compensation layer arranged oppositely, wherein the touch layer and the optical compensation layer are insulated from each other, and an orthographic projection of the optical compensation layer on a surface of the touch layer covers the touch layer;
the touch layer comprises a plurality of first electrode groups arranged along a first direction and extending along a second direction and a plurality of second electrode groups arranged along the second direction and extending along the first direction, wherein the first direction and the second direction intersect, and the plurality of first electrode groups are insulated from the plurality of second electrode groups; and
at least one of the plurality of first electrode groups comprises a plurality of first touch electrodes connected to each other, and at least one of the plurality of second electrode groups comprises a plurality of second touch electrodes connected to each other through the optical compensation layer;
wherein the display device further comprises an insulation layer arranged between the touch layer and the optical compensation layer, wherein
the insulation layer comprises a plurality of first vias;
the optical compensation layer comprises an optical compensation structure and a first electrode connection structure, wherein the optical compensation structure and the first electrode connection are insulated from each other; and
the first electrode connection structure comprises at least one first connection electrode, wherein the first connection electrode is connected to two adjacent second touch electrodes through the plurality of first vias;
wherein,
the first electrode connection structure comprises at least two first connection electrodes, at least one of the plurality of first electrode groups further comprises a first connection portion, and adjacent first touch electrodes of the plurality of first touch electrodes are connected through the first connection portion, wherein the first connection portion comprise a first connection area and a second connection area, a length of the first connection area along the first direction is less than a length of the second connection area along the first direction, and an orthographic projection of the first connection area on the touch layer overlaps an orthographic projection of one first connection electrode on the touch layer; or
the optical compensation layer further comprises a plurality of first isolation structures, and at least one of the plurality of first isolation structures comprises a first slit surrounding the first connection electrode.

20. The display device according to claim 19, wherein in a case that at least one of the plurality of first isolation structures comprises the first slit surrounding the first connection electrode, a width of the first slit ranges from 5 μm to 10 μm.

21. The display device according to claim 19, wherein in a case that at least one of the plurality of first isolation structures comprises the first slit surrounding the first connection electrode, an edge of the first slit comprises a curved shape.

22. A display device, comprising:
a display unit and a touch unit, wherein
the touch unit comprises a touch layer and an optical compensation layer arranged oppositely, wherein the touch layer and the optical compensation layer are insulated from each other, and an orthographic projection of the optical compensation layer on a surface of the touch layer covers the touch layer;
the touch layer comprises a plurality of first electrode groups arranged along a first direction and extending along a second direction and a plurality of second electrode groups arranged along the second direction and extending along the first direction, wherein the first direction and the second direction intersect, and the plurality of first electrode groups are insulated from the plurality of second electrode groups; and
at least one of the plurality of first electrode groups comprises a plurality of first touch electrodes connected to each other, and at least one of the plurality of second electrode groups comprises a plurality of second touch electrodes connected to each other through the optical compensation layer;
wherein the optical compensation layer comprises a plurality of third electrode groups arranged along the first direction and extending along the second direction and a plurality of fourth electrode groups arranged along the second direction and extending along the first direction, wherein
the plurality of third electrode groups are insulated from the plurality of fourth electrode groups;
the plurality of third electrode groups are connected in parallel with the plurality of first electrode groups; and
the plurality of fourth electrode groups are connected in parallel with the plurality of second electrode groups.

23. The display device according to claim 22, further comprising an insulation layer arranged between the touch layer and the optical compensation layer, wherein
the insulation layer comprises a plurality of second vias and a plurality of third vias;
at least one of the plurality of third electrode groups comprises a plurality of third touch electrodes and a plurality of second isolation structures, the plurality of third touch electrodes are electrically connected to the plurality of first electrode groups through the plurality of the second vias, and at least one of the plurality of second isolation structures comprises a second slit surrounding a third touch electrode; and
at least one of the plurality of fourth electrode groups comprises a plurality of fourth touch electrodes connected to each other, and the plurality of fourth touch electrodes are electrically connected to the plurality of second electrode groups through the plurality of third vias.

24. The display device according to claim 23, wherein an edge of at least one of the plurality of third touch electrodes comprises a curved shape, and an edge of at least one of the plurality of fourth touch electrodes comprises the curved shape.

25. The display device according to claim 22, further comprising an insulation layer arranged between the touch layer and the optical compensation layer, wherein
the insulation layer comprises a plurality of fourth vias and a plurality of fifth vias;
at least one of the plurality of third electrode groups comprises a plurality of third touch electrodes connected to each other, and the plurality of third touch electrodes are electrically connected to the plurality of first electrode groups through the plurality of fourth vias; and at least one of the plurality of fourth electrode groups comprises a plurality of fourth touch electrodes, a plurality of third isolation structures and a plurality of second electrode connection structures, and a plurality of fourth touch groups are electrically connected to the plurality of second electrode groups through the plurality of fourth vias, wherein at least one of the plurality of third isolation structures comprises a third slit surrounding a fourth touch electrode, and at least one of the plurality of second electrode connection structures comprises a second connection electrode used to connect adjacent fourth touch electrodes of the plurality of fourth touch electrodes.

26. The display device according to claim 25, wherein at least one of the plurality of second electrode connection structures comprises at least two second connection electrodes; and at least one of the plurality of third electrode groups further comprises a second connection portion, and adjacent third touch electrodes of the plurality of third touch electrodes are connected to each other through the second connection portion, wherein the second connection portion comprises a third connection area and a fourth connection area, a length of the third connection area along the first direction is less than a length of the fourth connection area along the first direction, and an orthographic projection of the third connection area on the touch layer overlaps an orthographic projection of the second connection electrode on the touch layer.

27. The display device according to claim 26, wherein an edge of at least one of the plurality of third touch electrodes comprises a curved shape, and an edge of at least one of the plurality of fourth touch electrodes comprises the curved shape.

28. The display device according to claim 25, wherein an edge of at least one of the plurality of third touch electrodes comprises a curved shape, and an edge of at least one of the plurality of fourth touch electrodes comprises the curved shape.

29. A display device, comprising:

a display unit and a touch unit, wherein the touch unit comprises a touch layer and an optical compensation layer arranged oppositely, wherein the touch layer and the optical compensation layer are insulated from each other, and an orthographic projection of the optical compensation layer on a surface of the touch layer covers the touch layer;

the touch layer comprises a plurality of first electrode groups arranged along a first direction and extending along a second direction and a plurality of second electrode groups arranged along the second direction and extending along the first direction, wherein the first direction and the second direction intersect, and the plurality of first electrode groups are insulated from the plurality of second electrode groups; and at least one of the plurality of first electrode groups comprises a plurality of first touch electrodes connected to each other, and at least one of the plurality of second electrode groups comprises a plurality of second touch electrodes connected to each other through the optical compensation layer;

wherein both the touch layer and the optical compensation layer are indium tin oxide layers or indium zinc oxide layers.

* * * * *